(12) United States Patent
Morohoshi

(10) Patent No.: US 11,137,726 B2
(45) Date of Patent: Oct. 5, 2021

(54) ELECTRONIC TIMEPIECE, TIME CORRECTION METHOD, AND STORAGE MEDIUM

(71) Applicant: CASIO COMPUTER CO., LTD., Tokyo (JP)

(72) Inventor: Hiroshi Morohoshi, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 284 days.

(21) Appl. No.: 15/987,636

(22) Filed: May 23, 2018

(65) Prior Publication Data
US 2018/0373206 A1 Dec. 27, 2018

(30) Foreign Application Priority Data
Jun. 27, 2017 (JP) .............................. JP2017-125421

(51) Int. Cl.
G04R 20/02 (2013.01)
G04G 5/00 (2013.01)
G04R 20/04 (2013.01)
G04G 21/04 (2013.01)

(52) U.S. Cl.
CPC .............. *G04R 20/02* (2013.01); *G04G 5/00* (2013.01); *G04G 21/04* (2013.01); *G04R 20/04* (2013.01)

(58) Field of Classification Search
CPC ........ G04R 20/02; G04R 20/08; G04R 20/04; G04G 5/00; G04G 21/04
See application file for complete search history.

(56) References Cited

U.S. PATENT DOCUMENTS

| 5,724,316 | A  | * | 3/1998  | Brunts    | G01C 21/3697 |
|           |    |   |         |           | 340/988      |
| 8,009,519 | B2 | * | 8/2011  | Jazra     | G01S 19/25   |
|           |    |   |         |           | 368/46       |
| 8,520,473 | B2 | * | 8/2013  | Honda     | G04B 47/06   |
|           |    |   |         |           | 368/14       |
| 9,104,182 | B2 | * | 8/2015  | Honda     | G04G 21/00   |
| 9,213,318 | B2 |   | 12/2015 | Honda et al. |           |
| 9,342,056 | B2 |   | 5/2016  | Honda et al. |           |
| 9,411,318 | B2 |   | 8/2016  | Kobayashi |              |

(Continued)

FOREIGN PATENT DOCUMENTS

CN 102968050 A 3/2013
JP 07004632 Y2 2/1995

(Continued)

OTHER PUBLICATIONS

Chinese Office Action (and English language translation thereof) dated Feb. 19, 2020 issued in Chinese Application No. 201810663824.5.

(Continued)

*Primary Examiner* — Sean Kayes
(74) *Attorney, Agent, or Firm* — Holtz, Holtz & Volek PC

(57) ABSTRACT

An electronic timepiece includes a clocking means configured to clock time, a switch configured to accept an input, and a processor configured to measure a period during which the switch is accepting an input, determine in accordance with a result of the measurement whether to change time difference data set in the electronic timepiece, and correct the time clocked by the clocking means on the basis of the time difference data.

17 Claims, 10 Drawing Sheets

(56) References Cited

U.S. PATENT DOCUMENTS

| | | | |
|---|---|---|---|
| 9,448,540 B2* | 9/2016 | Baba .................. | G01S 19/24 |
| 9,720,383 B2 | 8/2017 | Honda et al. | |
| 9,897,979 B2* | 2/2018 | Fujisawa ............. | G04R 20/02 |
| 10,031,487 B2* | 7/2018 | Fujisawa ............. | G04R 20/02 |
| 2009/0219205 A1* | 9/2009 | Jazra .................. | G04R 20/02 |
| | | | 342/357.64 |
| 2010/0220555 A1* | 9/2010 | Honda ................ | G04R 20/04 |
| | | | 368/14 |
| 2015/0253740 A1* | 9/2015 | Nishijima ............ | G04C 9/08 |
| | | | 368/80 |
| 2015/0253742 A1* | 9/2015 | Baba .................. | G04R 20/02 |
| | | | 368/14 |
| 2016/0360344 A1* | 12/2016 | Shim .................. | H04L 12/2803 |
| 2017/0261944 A1* | 9/2017 | Fujisawa ............. | G04R 60/10 |

FOREIGN PATENT DOCUMENTS

| | | |
|---|---|---|
| JP | 2001228272 A | 8/2001 |
| JP | 2005055195 A | 3/2005 |
| JP | 2015169574 A | 9/2015 |
| JP | 2015184106 A | 10/2015 |
| JP | 2015184193 A | 10/2015 |
| JP | 2016200509 A | 12/2016 |

OTHER PUBLICATIONS

Japanese Office Action (and English language translation thereof) dated May 25, 2021 issued in Japanese Application No. 2017-125421.

* cited by examiner

ELECTRONIC TIMEPIECE, TIME CORRECTION METHOD, AND STORAGE MEDIUM

BACKGROUND OF THE INVENTION

1. Field of the Invention

The present invention relates to an electronic timepiece, a time correction method, and a storage medium.

2. Description of the Related Art

Electronic timepieces (clocks, cameras, etc.) which correct the time clocked by an internal clock (clocking means) on the basis of received radio waves (such as GPS signals) are known.

For example, Japanese Patent Application Laid-Open No. 2001-228272 discloses an electronic timepiece (camera) which, when the power switch is turned on, compares the value clocked by an internal clock with the date/time information stored in a non-volatile memory, and when the former, clocked value is closer, writes the clocked value into the non-volatile memory, whereas when the latter, date/time information is closer, moves to automatic date/time correction processing using received radio waves.

With the electronic timepiece as described above, even when the time clocked by the internal clock is reset due to battery replacement, when the power is turned on again, the time clocked by the internal clock can be automatically corrected on the basis of the received radio waves.

For correcting the time clocked by an internal clock, various time correction modes are conceivable.

Such modes may include, for example, a first time correction mode in which the time clocked by the internal clock is corrected on the basis of received radio waves, with time difference data set in the electronic timepiece being kept unchanged, and a second time correction mode in which the time clocked by the internal clock is corrected and the time difference data set in the electronic timepiece is also changed on the basis of the received radio waves.

It should be noted that the time difference data set in the electronic timepiece includes time difference information using a standard time as a reference, and information on daylight saving time used during a certain period of time.

SUMMARY OF THE INVENTION

One of the time correction modes as described above would be selected depending on which time, home time or local time, a person wants to be displayed while traveling abroad on business or on holiday, for example. It is desirable that the time correction modes can be switched with simple manipulations, without requiring a complicated procedure.

To accomplish the above object, a preferred embodiment is understood by the following configuration.

The electronic timepiece according to the present invention includes: a clocking means configured to clock time; a switch configured to accept an input; and a processor configured to measure a period during which the switch is accepting an input, determine in accordance with a result of the measurement whether to change time difference data set in the electronic timepiece, and correct the time clocked by the clocking means on the basis of the time difference data.

DETAILED DESCRIPTION OF THE PREFERRED EMBODIMENTS

An electronic timepiece 1 according to an embodiment will be described below with reference to the attached drawings.

While the electronic timepiece 1 will be described as a clock itself in the following embodiment, the electronic timepiece 1 of the present invention is not limited to the clock itself; it may be a clock installed in electronic equipment or the like.

Figure 1:
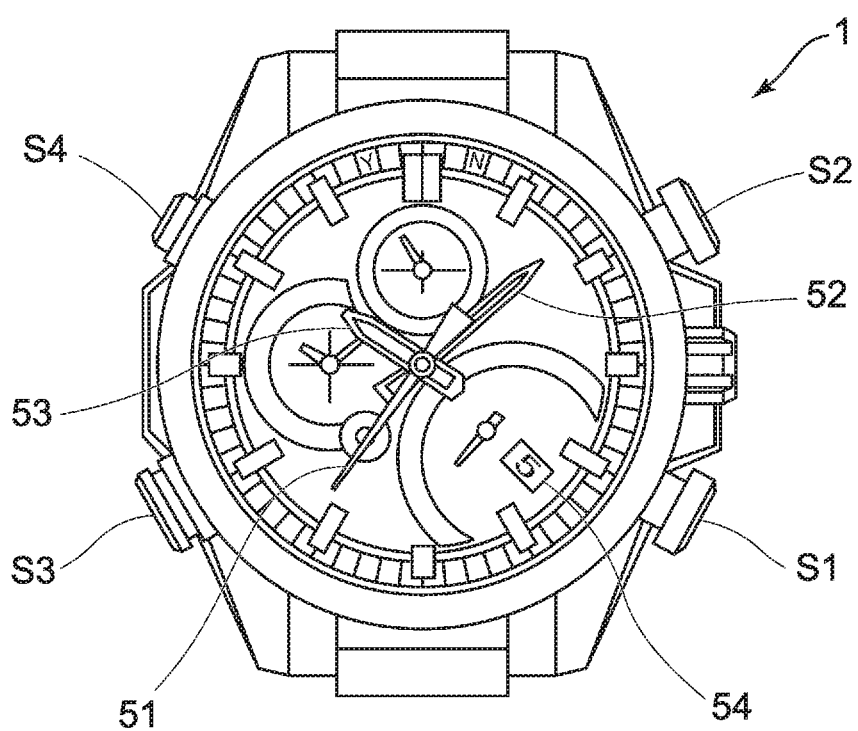
FIG. 1 is a front view of an electronic timepiece according to an embodiment.
Figure 2:
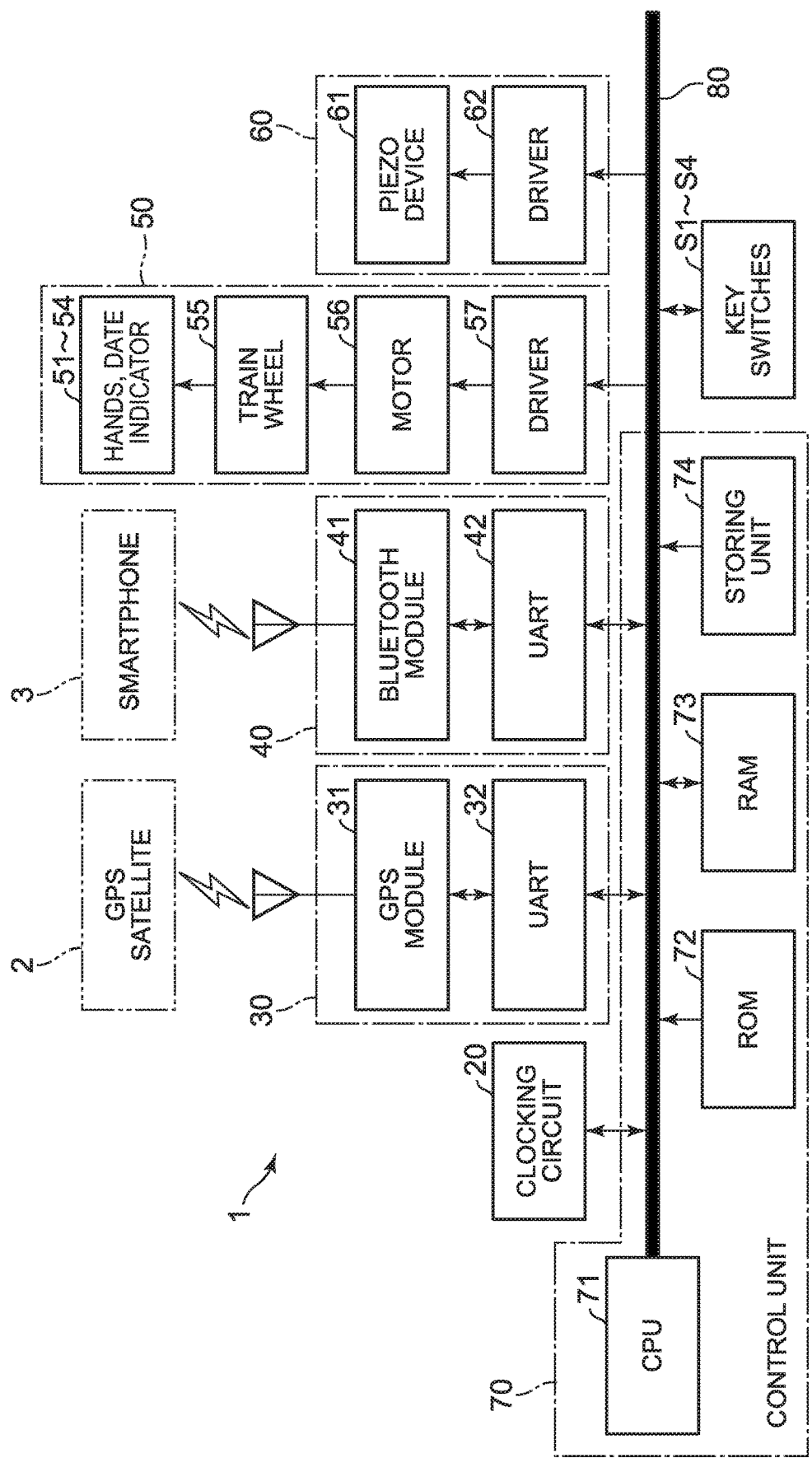
FIG. 2 is a block diagram of the electronic timepiece according to the embodiment.

FIG. 1 is a front view of the electronic timepiece 1 according to the embodiment, and FIG. 2 is a block diagram of the electronic timepiece 1 according to the embodiment.

As shown in FIGS. 1 and 2, the electronic timepiece 1 according to the present embodiment is a wristwatch, which includes: a clocking circuit 20, which functions as a clocking means configured to clock time; a GPS receiving unit 30, which receives GPS radio waves transmitted from a GPS satellite 2; a short-range wireless communication unit 40, which communicates with a mobile terminal such as a smartphone 3; a date and time display unit 50, which displays date and time; a sound output unit 60, which outputs sound; a plurality of key switches S1 to S4, which function as input means configured to accept user input manipulations; a control unit 70, which performs overall control of the electronic timepiece 1, and a bus 80, which connects the above elements.

The clocking circuit 20 clocks time in units of $1/256$ seconds, for example, and outputs seconds, minutes, hours, and date of the month as the clocked results.

The GPS receiving unit 30 includes a GPS module 31, which receives GPS radio waves from a plurality of GPS satellites 2, and a UART 32, which converts serial signals to and from parallel signals between the GPS module 31 and the bus 80.

The GPS radio waves include time data indicating a standard time (for example, Coordinated Universal Time: UTC), and positional data indicating the position of each GPS satellite 2.

The GPS module 31 is capable of measuring a distance between a GPS satellite 2 and the electronic timepiece 1 on the basis of the time of arrival of the GPS radio waves. The GPS module 31 can specify the position (latitude and longitude) of the electronic timepiece 1 on the earth by receiving the GPS radio waves from three or more GPS satellites 2.

The short-range wireless communication unit 40 includes a Bluetooth (registered trademark) module 41, which communicates with, for example, a smartphone 3 using Bluetooth as a short-range wireless communication standard, and a UART 42, which converts serial signals to and from parallel signals between the Bluetooth module 41 and the bus 80.

The Bluetooth module 41 in the present embodiment supports Bluetooth Low Energy (BLE), which enables communication using less power than conventional Bluetooth (classic). Hereinafter, the communication with a smartphone 3 will be referred to as "BLE" as appropriate.

The smartphone 3 has a clocking circuit equivalent to the electronic timepiece 1, and also has time difference data set therein. The time difference data includes time difference information (hereinafter, referred to as "time difference" as appropriate) using a standard time (UTC) as a reference, and information on daylight saving time (hereinafter, referred to as "DST" as appropriate) used during a certain period of time.

The smartphone 3 also has functions of acquiring data for use in correction of time (hereinafter, time correction data) from a timekeeping server via the Internet, and receiving GPS radio waves from a GPS satellite 2. In general, the smartphone 3 automatically corrects the time clocked by the clocking circuit 20, on the basis of the time correction data acquired via the Internet or of the GPS radio waves received from the GPS satellite 2.

The date and time display unit 50 includes a second hand 51 indicating seconds, a minute hand 52 indicating minutes, an hour hand 53 indicating hours, a date indicator 54 indicating date of the month, a train wheel 55 connected to the second hand 51, the minute hand 52, the hour hand 53, and the date indicator 54, a motor 56 for moving the second hand 51, the minute hand 52, the hour hand 53, and the date indicator 54 via the train wheel 55, and a driver 57 driving the motor 56.

The date and time display unit 50 in the present embodiment not only displays the date and time clocked by the clocking circuit 20, but also functions as a processing result display unit that displays whether the processing performed by the control unit 70 has succeeded or not.

For example, a character "Y" indicating the success of processing and a character "N" indicating the failure of processing may be provided on places that can be pointed to by the second hand 51. Then, the operation of the second hand 51 can be controlled so as to cause it to point to either of the characters to thereby display the processing result of the control unit 70.

The sound output unit 60 includes a piezo device 61 which produces a sound, and a driver 62 which drives the piezo device 61.

The sound output unit 60 is operated for outputting an alarm sound, for example.

The key switches S1 to S4 are manipulated for using various functions of the electronic timepiece 1 or for performing various settings.

For example, in the present embodiment, the key switch S1 is used as a manipulation tool for performing: displaying a received result, time correction processing 1, time correction processing 2, and mode switching of automatic time correction, as will be described later.

The control unit 70 functions as a control means, and includes a CPU 71, a ROM 72 as a read-only non-volatile memory, a RAM 73 as a readable/writable volatile memory, and a storing unit 74, such as a flash memory, as a readable/writable non-volatile memory.

The ROM 72 stores, not only control programs used for overall control of the electronic timepiece 1, but also table data in which positional information is associated with time difference data (time difference information and daylight saving time information). The RAM 73 stores data generated as the CPU 71 performs control in accordance with the control programs. The storing unit 74 stores various setting data.

For example, the storing unit 74 stores the time difference data, which includes the time difference information (time zones) with reference to a standard time (UTC), and the information on daylight saving time (DST) used during a certain period of time.

The control unit 70, with the CPU 71 operating in accordance with the control programs stored in the ROM 72, cooperates with the clocking circuit 20 to thereby function as a measuring means.

Further, the control unit 70, with the CPU 71 operating in accordance with the control programs stored in the ROM 72, functions as a time correcting means.

The measuring means measures a period during which the key switch S1 is kept manipulated, and the time correcting means corrects the time clocked by the clocking circuit 20 in accordance with the measurement result by the measuring means, as will be described later in detail.

According to the measuring means, control means, and time correcting means as described above, a user only needs to manipulate the key switch S1 for a predetermined period to correct the time clocked by the clocking circuit 20. The manipulation when correcting the time is thus simplified as compared to the case requiring a plurality of key switch manipulations.

The time correcting means in the present embodiment includes time correction processing 1 and time correction processing 2 in which the time clocked by the clocking circuit 20 is corrected using different processing procedures. The time correcting means compares the measurement result of the measuring means with a plurality of threshold values (for example, 1.5 seconds and 3.0 seconds), and selects one of the time correction processing 1 and 2 on the basis of the comparison result.

According to the time correcting means as described above, the time correction processing 1 or 2 can be selected on the basis of how long the key switch S1 is kept manipulated, to thereby correct the time clocked by the clocking circuit 20.

In the case of the time correction processing 1, the time correcting means in the present embodiment corrects the time clocked by the clocking circuit 20, on the basis of time correction data acquired from the outside (GPS satellite 2 or smartphone 3), while keeping unchanged the time difference data (time difference information and daylight saving time information) stored in the storing unit 74 of the electronic timepiece 1.

On the other hand, in the case of the time correction processing 2, the time correcting means changes the time difference data stored in the storing unit 74 of the electronic timepiece 1 and also corrects the time clocked by the clocking circuit 20, on the basis of the time correction data acquired from the outside.

According to the time correcting means as described above, the time correction processing 1 or the time correction processing 2 can be performed selectively depending on which time, home time or local time, the user wants to be displayed while traveling abroad on business or on holiday.

The time correction data includes GPS radio waves transmitted from one or more GPS satellites 2.

In the case of the time correction processing 1, the time correcting means corrects the time clocked by the clocking circuit 20 on the basis of time data included in the GPS radio waves received from the GPS satellite(s) 2, while keeping unchanged the time difference data set in the electronic timepiece 1.

On the other hand, in the case of the time correction processing 2, the time correcting means changes the time difference data set in the electronic timepiece 1 on the basis of positional data included in the GPS radio waves received from the GPS satellites 2, and also corrects the time clocked by the clocking circuit 20 on the basis of the time data included in the GPS radio waves received from the GPS satellite(s) 2.

According to the time correcting means as described above, it is possible to utilize the GPS radio waves to correct the time clocked by the clocking circuit 20 and change the time difference data set in the electronic timepiece 1.

It should be noted that changing the time difference data on the basis of the GPS radio waves is performed through the following: a step of receiving GPS radio waves from three or more GPS satellites 2 to measure a distance between the electronic timepiece 1 and the respective one of the three or more GPS satellites 2 on the basis of the time of arrival of the corresponding GPS radio waves; a step of specifying the position (latitude and longitude) of the electronic timepiece 1 on the earth on the basis of the measured distances; and a step of extracting time difference data corresponding to the specified position by referring to the above-described table data.

The time correction data also includes time data and time difference data retained by a smartphone 3.

In the case of the time correction processing 1, the time correcting means corrects the time clocked by the clocking circuit 20 on the basis of the time data and the time difference data acquired from the smartphone 3, while keeping unchanged the time difference data set in the electronic timepiece 1.

On the other hand, in the case of the time correction processing 2, the time correcting means changes the time difference data set in the electronic timepiece 1 on the basis of the time difference data acquired from the smartphone 3, and also corrects the time clocked by the clocking circuit 20 on the basis of the time data acquired from the smartphone 3.

According to the time correcting means as described above, it is possible to utilize the time data and the time difference data retained by a smartphone 3 to correct the time clocked by the clocking circuit 20 and change the time difference data set in the electronic timepiece 1.

When the time correcting means in the present embodiment is to correct the time clocked by the clocking circuit 20 and/or to change the time difference data set in the electronic timepiece 1 by utilizing GPS radio waves and/or time data and time difference data retained by a smartphone 3, the time correcting means firstly attempts to acquire the time data and the time difference data from the smartphone 3, and if the acquisition attempt fails, it receives the GPS radio waves from the GPS satellite(s) 2.

According to the time correcting means as described above, BLE using less power takes precedence over reception of GPS radio waves, so the power consumed by the electronic timepiece 1 is reduced.

A description will now be made, with reference to FIGS. 3 to 10, about the specific processing procedures of the control unit 70 implementing the above-described time correcting means.

Figure 3:
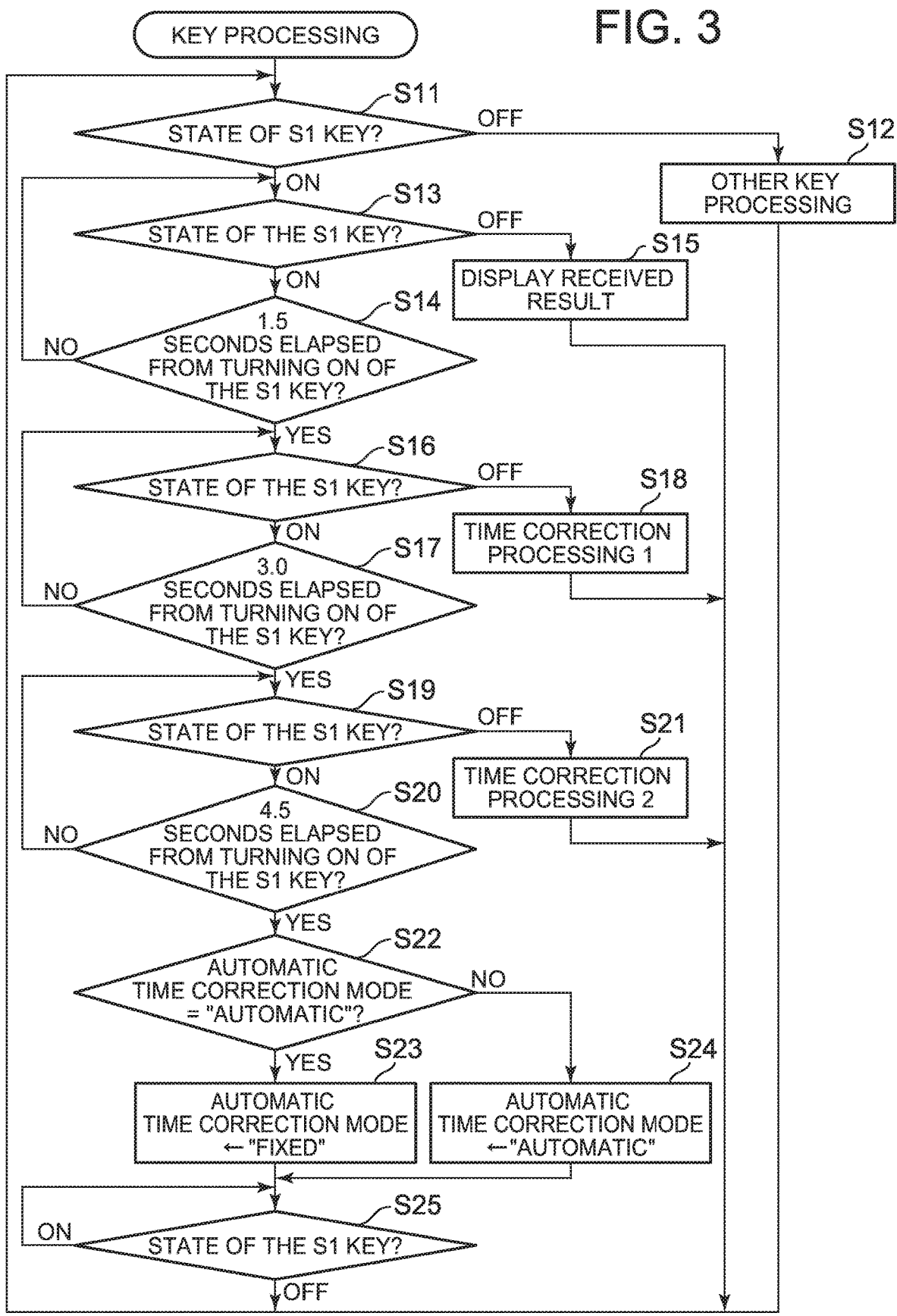
FIG. 3 is a flowchart illustrating key processing in the electronic timepiece according to the embodiment.

FIG. 3 is a flowchart illustrating key processing of the electronic timepiece 1 according to the embodiment.

Figure 4:
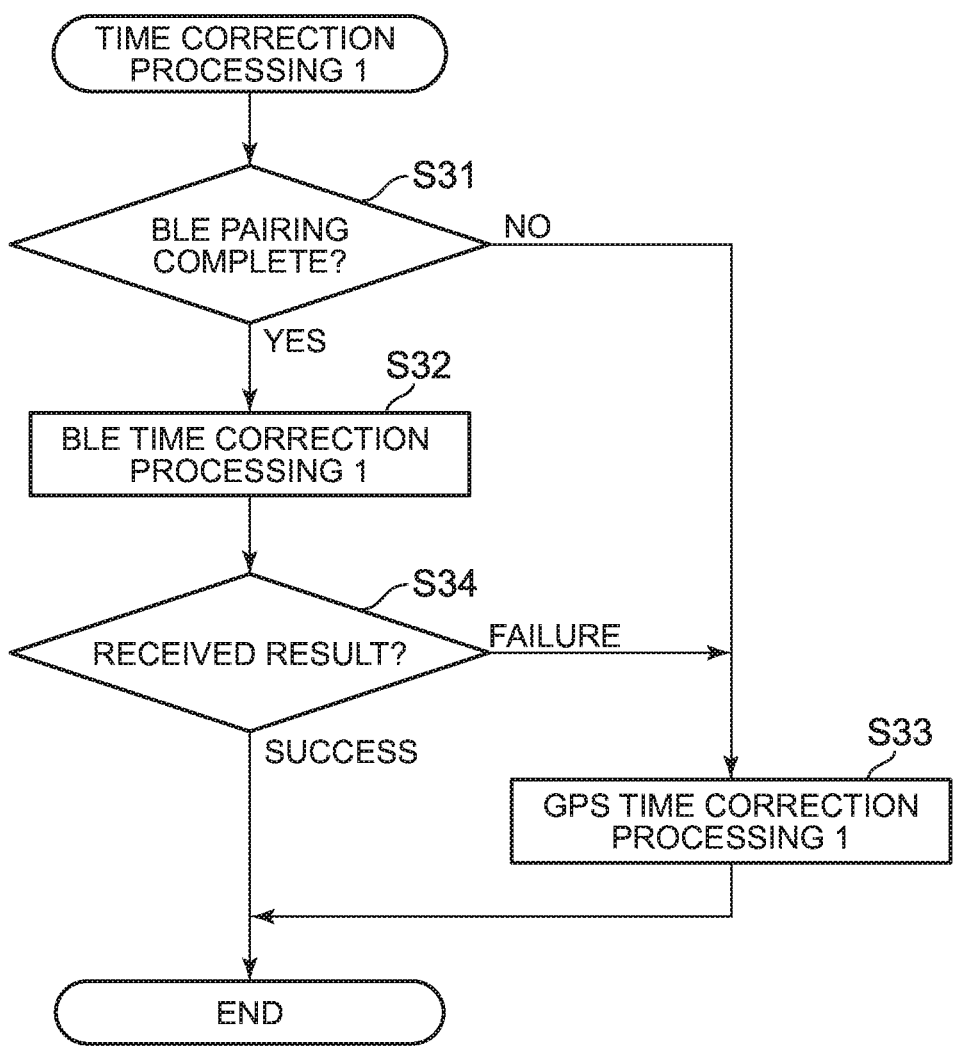
FIG. 4 is a flowchart illustrating time correction processing 1 (first time correction mode) of the electronic timepiece according to the embodiment.
Figure 5:
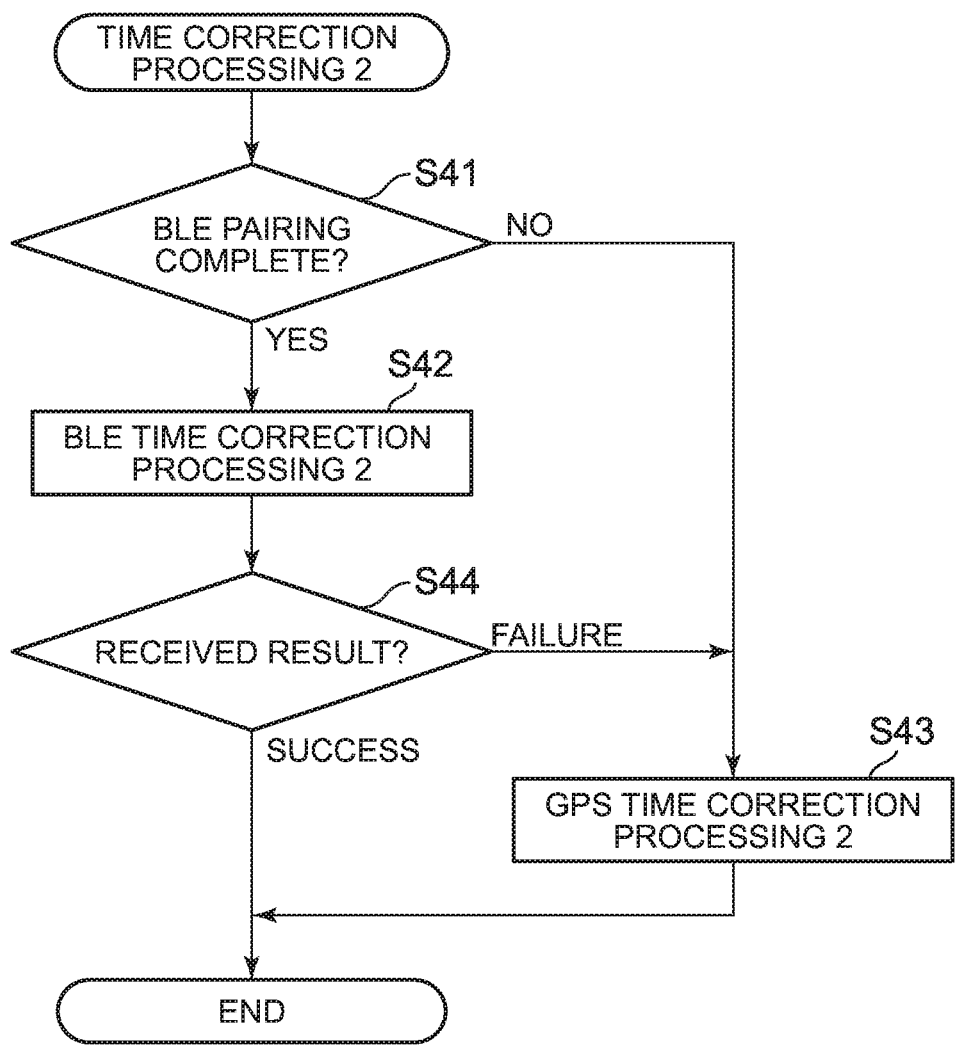
FIG. 5 is a flowchart illustrating time correction processing 2 (second time correction mode) of the electronic timepiece according to the embodiment.

FIG. 4 is a flowchart illustrating time correction processing 1 (first time correction mode) of the electronic timepiece 1 according to the embodiment, and FIG. 5 is a flowchart illustrating time correction processing 2 (second time correction mode) of the electronic timepiece 1 according to the embodiment.

Figure 6:
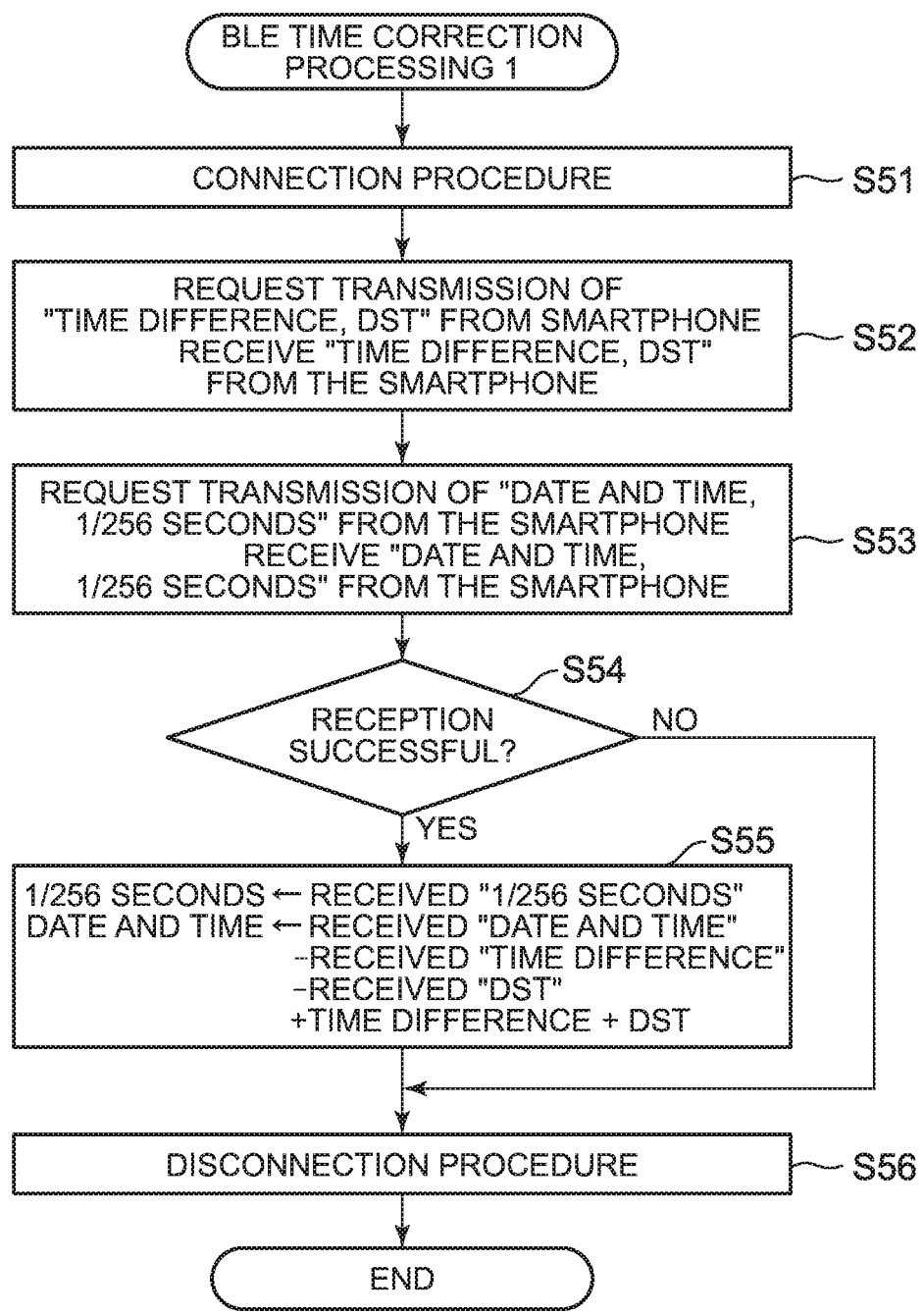
FIG. 6 is a flowchart illustrating BLE time correction processing 1 of the electronic timepiece according to the embodiment.
Figure 7:
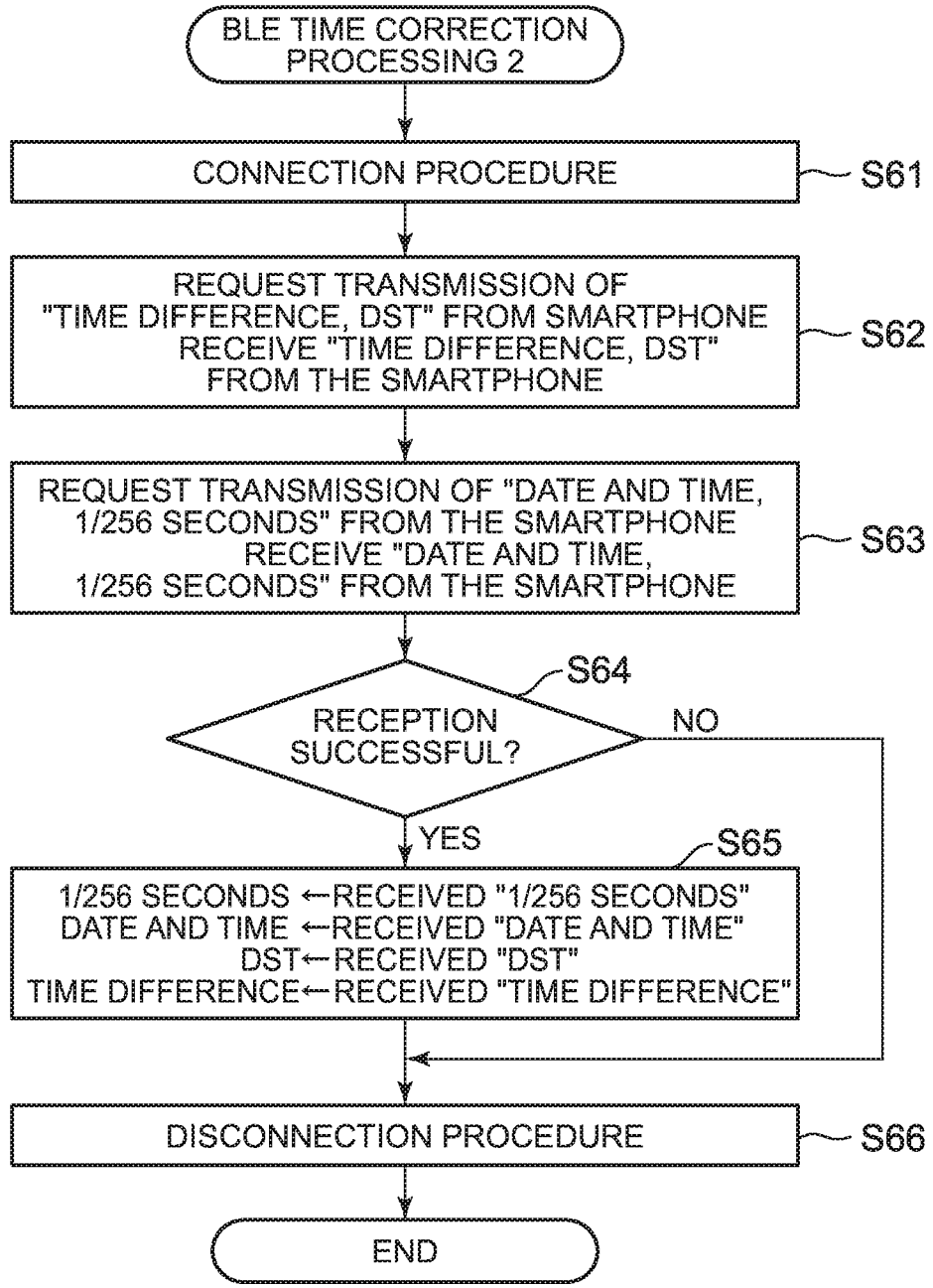
FIG. 7 is a flowchart illustrating BLE time correction processing 2 of the electronic timepiece according to the embodiment.

FIG. 6 is a flowchart illustrating BLE time correction processing 1 of the electronic timepiece 1 according to the embodiment, and FIG. 7 is a flowchart illustrating BLE time correction processing 2 of the electronic timepiece 1 according to the embodiment.

Figure 8:
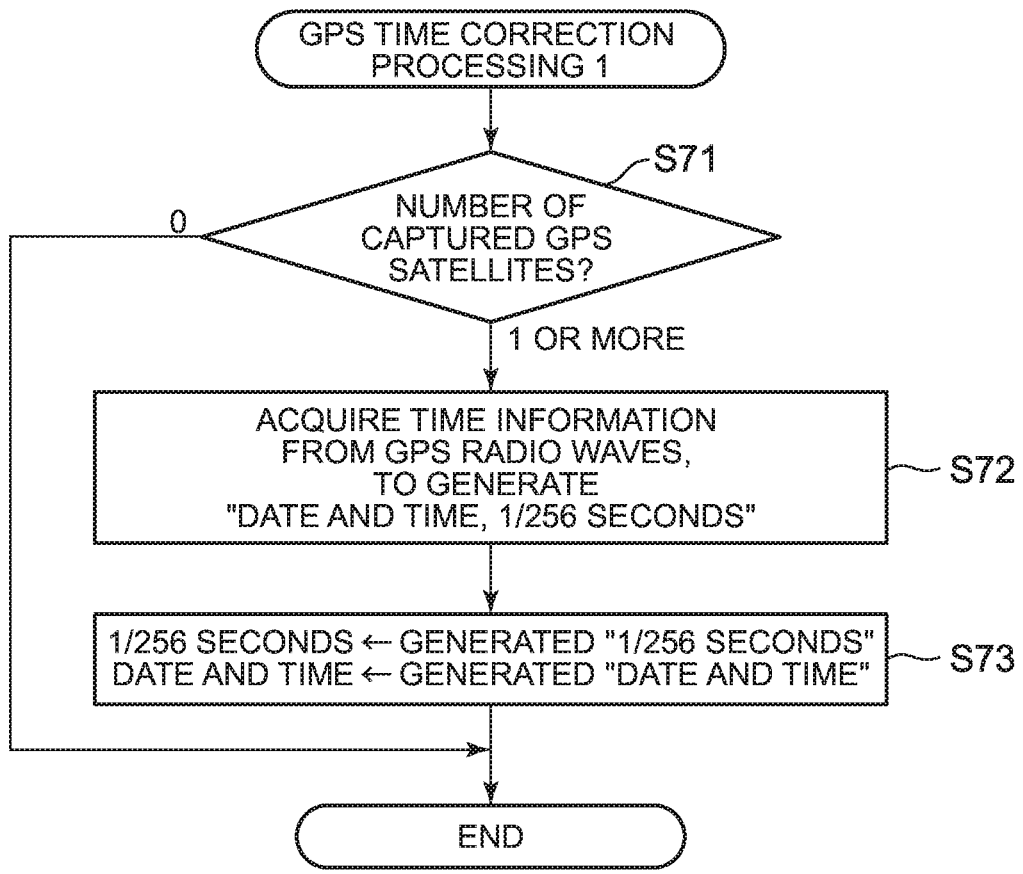
FIG. 8 is a flowchart illustrating GPS time correction processing 1 of the electronic timepiece according to the embodiment.
Figure 9:
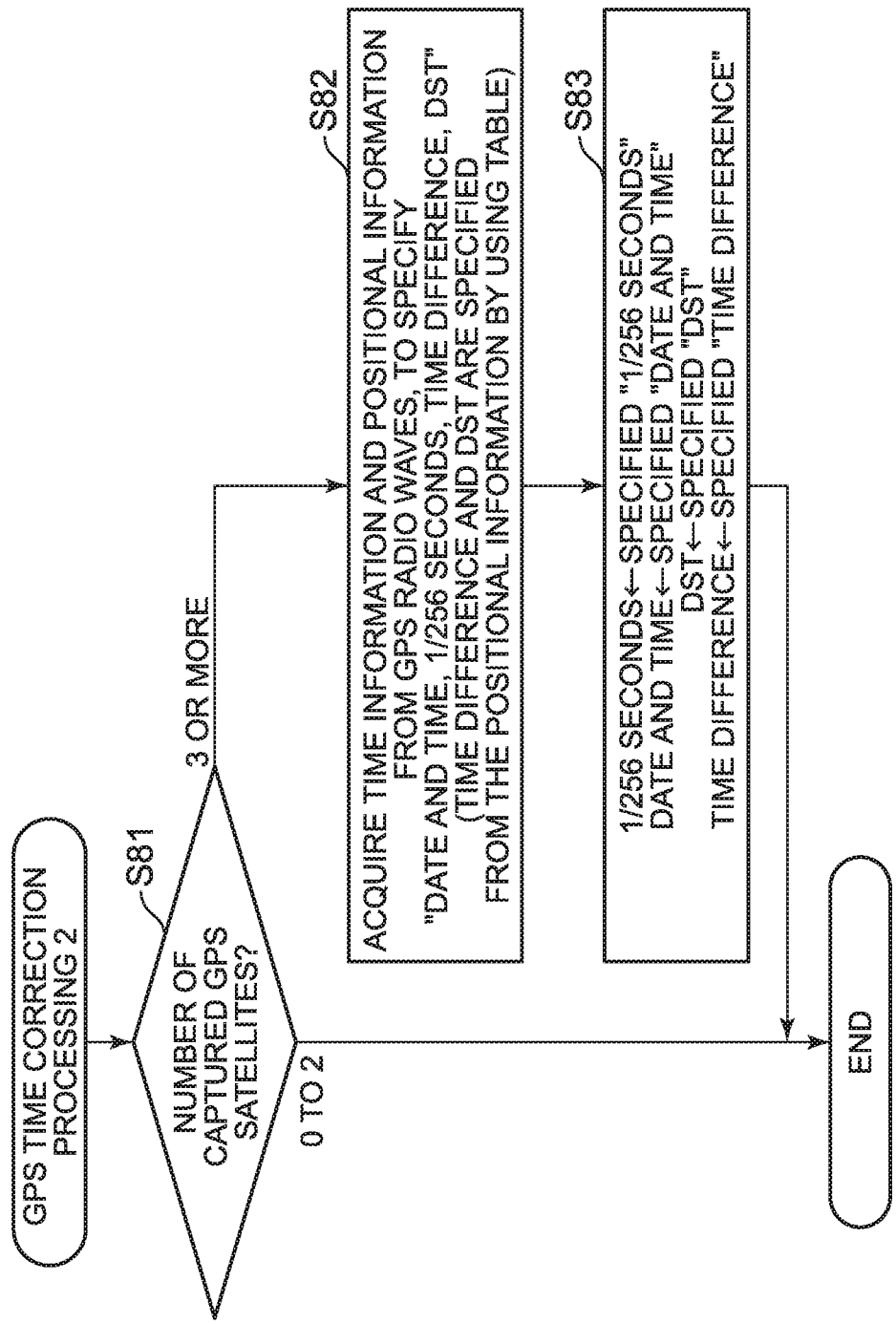
FIG. 9 is a flowchart illustrating GPS time correction processing 2 of the electronic timepiece according to the embodiment.

FIG. 8 is a flowchart illustrating GPS time correction processing 1 of the electronic timepiece 1 according to the embodiment, and FIG. 9 is a flowchart illustrating GPS time correction processing 2 of the electronic timepiece 1 according to the embodiment.

Figure 10:
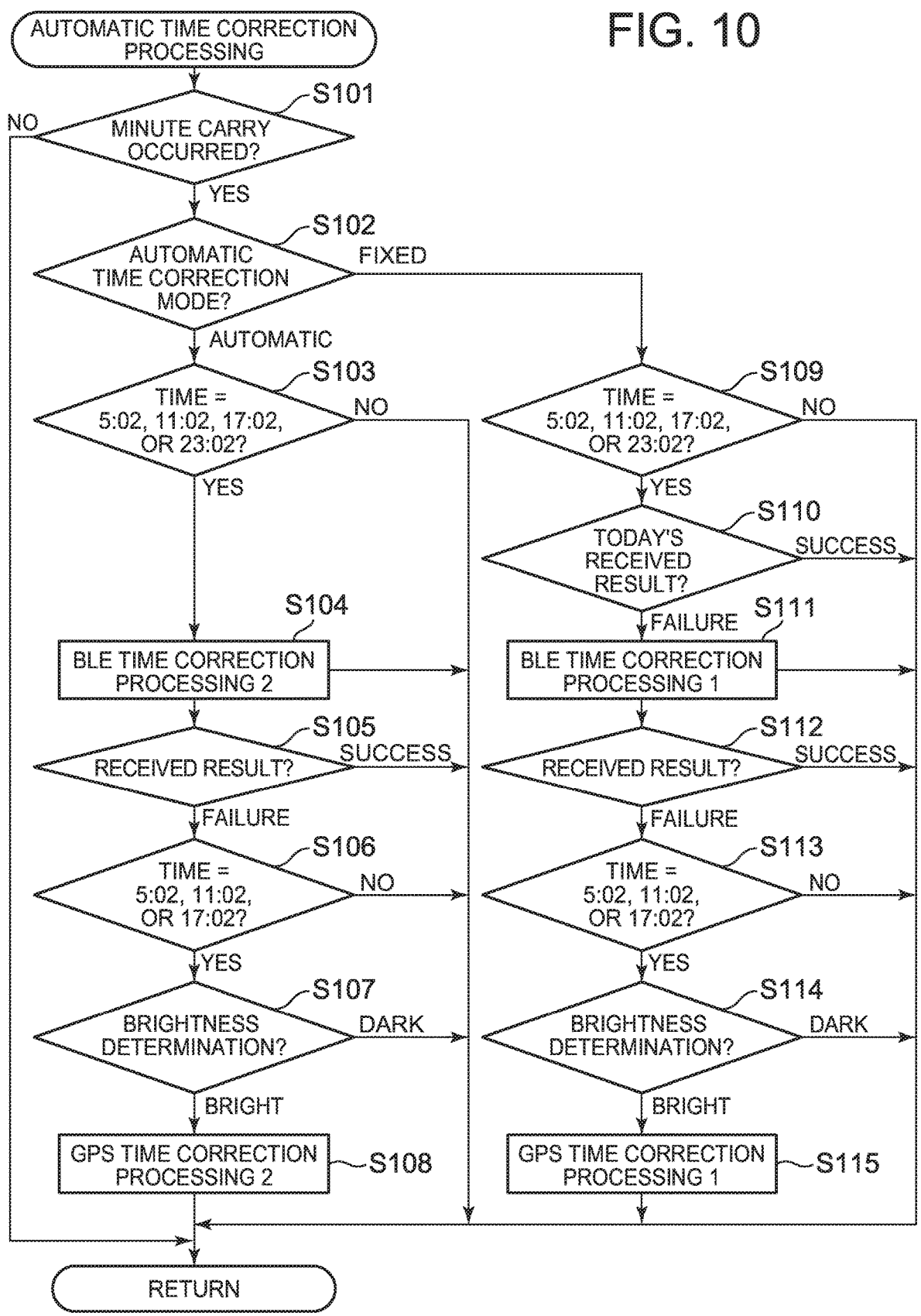
FIG. 10 is a flowchart illustrating automatic time correction processing of the electronic timepiece according to the embodiment.

FIG. 10 is a flowchart illustrating automatic time correction processing of the electronic timepiece 1 according to the embodiment.

As shown in FIG. 3, the control unit 70 performs key processing which includes: displaying a received result, time correction processing 1, time correction processing 2, and mode switching of automatic time correction.

As the key processing starts, the control unit 70 firstly determines whether the key switch S1 is ON or OFF (step S11). If the determination result is OFF, other key processing is performed (step S12), and the process returns to step S11.

On the other hand, if the determination result in step S11 is ON, the control unit 70 determines the ON/OFF state of the key switch S1 again (step S13), and then determines whether 1.5 seconds have elapsed from the turning ON of the key switch S1 (step S14).

If the key switch S1 is turned OFF before a lapse of 1.5 seconds from the turning ON of the key switch S1, the control unit 70 performs displaying a received result (step S15), and the process returns to step S11.

Displaying a received result is a process of displaying whether the latest time correction processing has succeeded or not. For example, the second hand 51 may be caused to point to the character "Y" to indicate "success", or to the character "N" to indicate "failure".

On the other hand, if 1.5 seconds have elapsed from the turning ON of the key switch S1, the control unit 70 determines the ON/OFF state of the key switch S1 again (step S16), and determines whether 3.0 seconds have elapsed from the turning ON of the key switch S1 (step S17).

If the key switch S1 is turned OFF before a lapse of 3.0 seconds from the turning ON of the key switch S1, the control unit 70 performs time correction processing 1 (described later) (step S18), and the process returns to step S11.

On the other hand, if 3.0 seconds have elapsed from the turning ON of the key switch S1, the control unit 70 determines the ON/OFF state of the key switch S1 again (step S19), and determines whether 4.5 seconds have elapsed from the turning ON of the key switch S1 (step S20).

If the key switch S1 is turned OFF before a lapse of 4.5 seconds from the turning ON of the key switch S1, the control unit 70 performs time correction processing 2 (described later) (step S21), and the process returns to step S11.

On the other hand, if 4.5 seconds have elapsed from the turning ON of the key switch S1, the control unit 70 determines if the mode of automatic time correction (described later) is "automatic" (mode in which time difference data is changed automatically) or not (step S22). If the determination result is YES, the control unit 70 switches the mode of automatic time correction from "automatic" to "fixed" (mode in which time difference data is fixed) (step S23). If the determination result is NO, the control unit 70 switches the mode of automatic time correction from "fixed" to "automatic" (step S24).

Thereafter, the control unit 70 determines the ON/OFF state of the key switch S1 again (step S25), and once the key switch S1 is turned OFF, the process returns to S11.

The respective processing in the flow in FIG. 3 will now be described in order.

When the process proceeds to step S18 in FIG. 3, the time correction processing 1 illustrated in FIG. 4 starts.

In this case, the control unit 70 firstly determines whether BLE pairing between the electronic timepiece 1 and a smartphone 3 has been completed (step S31). If the determination result is YES, the control unit 70 performs BLE time correction processing 1 (described later) preferentially (step S32). If the determination result is NO, the control unit 70 performs GPS time correction processing 1 (described later) (step S33).

Following the execution of the BLE time correction processing 1, the control unit 70 determines the received result (result of the time correction) (step S34). If the determination result is "success", the time correction processing 1 is finished. If the determination result is "failure", the control unit 70 performs the GPS time correction processing 1 (step S33).

On the other hand, when the process proceeds to step S21 in FIG. 3, the time correction processing 2 illustrated in FIG. 5 starts.

In this case, the control unit 70 firstly determines whether BLE pairing between the electronic timepiece 1 and a smartphone 3 has been completed (step S41). If the determination result is YES, the control unit 70 performs BLE time correction processing 2 (described later) preferentially (step S42). If the determination result is NO, the control unit 70 performs GPS time correction processing 2 (described later) (step S43).

Following the execution of the BLE time correction processing 2, the control unit 70 determines the received result (result of the time correction) (step S44). If the determination result is "success", the time correction processing 2 is finished. If the determination result is "failure", the control unit 70 performs the GPS time correction processing 2 (step S43).

The respective processing in FIGS. 4 and 5 will now be described in order.

FIGS. 4 and 5 differ from each other in that the BLE time correction processing 1 is performed in step S32 in FIG. 4 while the BLE time correction processing 2 is performed in step S42 in FIG. 5, and that the GPS time correction processing 1 is performed in step S33 in FIG. 4 while the GPS time correction processing 2 is performed in step S43 in FIG. 5. In the following, for better understanding of the differences in content of the processing, a description will be given in the order of the BLE time correction processing 1, the BLE time correction processing 2, the GPS time correction processing 1, and the GPS time correction processing 2.

When the process proceeds to step S32 in FIG. 4, the BLE time correction processing 1 illustrated in FIG. 6 starts.

In this case, the control unit 70 firstly performs a procedure for connecting to a smartphone 3 (step S51), and requests transmission of time difference and DST from the smartphone 3, and receives the time difference and the DST transmitted from the smartphone 3 (step S52).

The control unit 70 then requests transmission of date and time as well as $1/256$ of a second from the smartphone 3, and receives the date and time and the $1/256$ seconds transmitted from the smartphone 3 (step S53).

It should be noted that if the smartphone 3 does not support the unit of $1/256$ seconds, the control unit 70 performs, for example, processing of finding $1/256$ of a second from the time (for example, seconds) transmitted from the smartphone 3 (the same applies hereinafter).

The control unit 70 then determines whether it has successfully received from the smartphone 3 data necessary for the time correction processing (step S54). If the determination result is YES, the control unit 70 corrects $1/256$ seconds of the time clocked by the clocking circuit 20 on the basis of the $1/256$ seconds received from the smartphone 3, and also corrects the date and time (seconds, minutes, hours, date) clocked by the clocking circuit 20 on the basis of the date and time, time difference, and DST received from the smartphone 3 and the time difference and DST set in the electronic timepiece 1 (step S55).

Namely, in the BLE time correction processing 1, with the time difference and the DST set in the electronic timepiece 1 being kept unchanged, the time clocked by the clocking circuit 20 is corrected on the basis of the date and time, time difference, and DST received from the smartphone 3. Specifically, the time difference and the DST received from the smartphone 3 are subtracted from the date and time received from the smartphone 3 to find a standard time (UTC), and then the time difference and the DST set in the electronic timepiece 1 are added to the standard time to thereby find date and time. The time clocked by the clocking circuit 20 is corrected on the basis of the date and time thus found.

Following the execution of the time correction processing in step S55, a procedure for disconnecting from the smartphone 3 is performed (step S56), whereby the BLE time correction processing 1 is finished.

If the determination result in step S54 is NO, the procedure for disconnecting from the smartphone 3 is performed (step S56), with no time correction processing as in step S55 being performed, to finish the BLE time correction processing 1.

It should be noted that the determination result in step S54 is recorded, and used for the determination in step S34 in FIG. 4 as well.

Further, if the determination result in step S54 is YES, recording is also performed so as to cause "Y" in FIG. 1 to be indicated when the process proceeds to step S15 in FIG. 3.

On the other hand, when the process proceeds to step S42 in FIG. 5, the BLE time correction processing 2 illustrated in FIG. 7 starts.

In this case, the control unit 70 firstly performs a procedure for connecting to a smartphone 3 (step S61), and requests transmission of time difference and DST from the smartphone 3, and receives the time difference and the DST transmitted from the smartphone 3 (step S62).

The control unit 70 then requests transmission of date and time as well as $1/256$ seconds from the smartphone 3, and receives the date and time and the $1/256$ seconds transmitted from the smartphone 3 (step S63).

The control unit 70 then determines whether it has successfully received from the smartphone 3 data necessary for the time correction processing (step S64). If the determination result is YES, the control unit 70 corrects $1/256$ seconds of the time clocked by the clocking circuit 20 on the basis of the $1/256$ seconds received from the smartphone 3, and also corrects the date and time (seconds, minutes, hours, date) clocked by the clocking circuit 20 on the basis of the date and time received from the smartphone 3. The control unit 70 further changes the time difference and the DST set in the electronic timepiece 1 on the basis of the time difference and the DST received from the smartphone 3 (step S65).

Following the execution of the time correction processing in step S65, a procedure for disconnecting from the smartphone 3 is performed (step S66), whereby the BLE time correction processing 2 is finished.

If the determination result in step S64 is NO, the procedure for disconnecting from the smartphone 3 is performed (step S66), with no time correction processing as in step S65 being performed, to finish the BLE time correction processing 2.

It should be noted that the determination result in step S64 is recorded, and used for the determination in step S44 in FIG. 5 as well.

Further, if the determination result in step S64 is YES, recording is also performed so as to cause "Y" in FIG. 1 to be indicated when the process proceeds to step S15 in FIG. 3.

When the process proceeds to step S33 in FIG. 4, the GPS time correction processing 1 illustrated in FIG. 8 starts.

In this case, the control unit 70 firstly determines the number of captured GPS satellites 2 (the number of GPS satellites from which GPS radio waves can be received) (step S71). If the number of captured satellites is zero, the GPS time correction processing 1 is terminated.

In this case, recording is performed so as to cause "N" in FIG. 1 to be indicated when the process proceeds to step S15 in FIG. 3.

On the other hand, if the number of captured GPS satellites 2 is one or more, the control unit 70 acquires time correction data from the GPS radio waves, and generates date and time as well as $1/256$ seconds on the basis of the acquired data (step S72). The control unit 70 then corrects the $1/256$ seconds of the time and the date and time (seconds, minutes, hours, date) clocked by the clocking circuit 20 (step S73), whereby the GPS time correction processing 1 is finished.

It should be noted that in the case of GPS satellites 2, the time correction data does not provide $1/256$ of a second. Thus, as mentioned above in conjunction with the smartphone 3, the control unit 70 performs processing of finding $1/256$ of a second on the basis of the acquired data, to thereby generate 1/256 seconds.

Further, when the process in step S73 is performed, recording is also performed so as to cause "Y" in FIG. 1 to be indicated when the process proceeds to step S15 in FIG. 3.

When the process proceeds to step S43 in FIG. 5, the GPS time correction processing 2 illustrated in FIG. 9 starts.

In this case, the control unit 70 firstly determines the number of captured GPS satellites 2 (the number of GPS satellites from which GPS radio waves can be received) (step S81). If the number of captured satellites is 0 to 2 (i.e. two or less), the GPS time correction processing 2 is terminated.

This is because the position of the electronic timepiece 1 on the earth cannot be found properly, hindering correction of time including the time difference and the DST.

In this case, recording is performed so as to cause "N" in FIG. 1 to be indicated when the process proceeds to step S15 in FIG. 3.

On the other hand, if the number of captured GPS satellites 2 is three or more, the control unit 70 specifies date and time, $1/256$ seconds, time difference, and DST on the basis of time data and positional data included in the GPS radio waves (step S82), and then corrects the $1/256$ seconds and the date and time clocked by the clocking circuit 20 on the basis of the specified $1/256$ seconds and date and time, and changes the time difference and the DST set in the electronic timepiece 1 on the basis of the specified time difference and DST (step S83).

When the process in step S83 is performed, recording is performed so as to cause "Y" in FIG. 1 to be indicated when the process proceeds to step S15 in FIG. 3.

It should be noted that, as explained above, specifying the time difference and the DST on the basis of the positional data included in the GPS radio waves is performed as follows: the distance between the electronic timepiece 1 and a respective one of the three or more GPS satellites 2 is measured on the basis of the arrival time of the GPS radio waves received from that GPS satellite 2, and the position of the electronic timepiece 1 on the earth is specified on the basis of the measured distances. The table data is then referred to, to extract the time difference and the DST corresponding to the specified position.

The processing described above with reference to FIGS. 3 to 9 is performed when the time correction starts in response to a user manipulation of the key switch S1. The electronic timepiece 1 has a function of automatically performing time correction at a predetermined timing. The automatic time correction processing will now be described with reference to FIG. 10.

As shown in FIG. 10, in the automatic time correction processing, the control unit 70 constantly checks for a minute carry (transition from 59 seconds to 00 seconds) (step S101).

If it is determined that a minute carry has occurred, the control unit 70 determines whether an automatic time correction mode is "automatic" (mode in which time difference data is changed automatically) or "fixed" (mode in which time difference data is fixed) (step S102).

If it is determined that the automatic time correction mode is "automatic", the control unit 70 determines whether the current time coincides with a time (for example, 5:02, 11:02, 17:02, or 23:02) set to perform the automatic time correction (step S103). If the determination result is NO, the process is finished.

If it is determined that the current time coincides with the time set to perform the automatic time correction, the control unit 70 performs the BLE time correction processing 2 shown in FIG. 7 as described above (step S104), and then determines the received result (result of the time correction) (step S105). If the determination result is "success", the process is finished.

If the received result is "failure", the control unit 70 performs the GPS time correction processing 2 shown in FIG. 9 as described above (step S108). At this time, however, it is highly likely that the electronic timepiece 1 when located inside a building or the like cannot receive GPS radio waves. Thus, by excluding any set time (for example, 23:02) at which the electronic timepiece 1 is probably located indoors, the control unit 70 determines again whether the current time coincides with a time (for example, 5:02, 11:02, or 17:02) set to perform the automatic time correction (step S106), and further performs brightness determination (such as detection of voltage generated by a solar power source) (step S107). Only if the determination result in step S106 is YES and the determination result in step S107 is "bright", the GPS time correction processing 2 is performed; otherwise, the process is finished.

This avoids a futile attempt of the GPS time correction processing 2, and reduces the power consumption.

On the other hand, if it is determined in step S102 that the automatic time correction mode is "fixed", the control unit 70 determines whether the current time coincides with a time (for example, 5:02, 11:02, 17:02, or 23:02) set to perform the automatic time correction (step S109). If the determination result is NO, the process is finished.

If it is determined that the current time coincides with the time set to perform the automatic time correction, the control unit 70 determines the today's received result (result of the time correction) (step S110). If the determination result is "success", the process is finished.

Namely, in the automatic mode involving changes of time difference data, the time correction processing is performed several times a day because it is unknown when a user will move to a place where time difference occurs. In the fixed mode involving no change of time difference data, the time correction processing performed once a day will suffice, so the time correction processing is prevented from being repeated two or more times a day, to suppress the power consumption.

On the other hand, if the determination result in step S110 is "failure", the control unit 70 performs the BLE time correction processing 1 shown in FIG. 6 as described above (step S111), and then determines the received result (step S112). If the determination result is "success", the process is finished.

If the received result is "failure", the control unit 70 performs the GPS time correction processing 1 shown in FIG. 8 as described above (step S115). At this time, as in the above case, any set time (for example, 23:02) at which the electronic timepiece 1 is probably located indoors is excluded, because the electronic timepiece 1 placed indoors would not likely be able to receive the GPS radio waves. The control unit 70 determines again whether the current time coincides with a time (for example, 5:02, 11:02, or 17:02) set to perform the automatic time correction (step S113), and also performs brightness determination (such as detection of voltage generated by a solar power source) (step S114). Only if the determination result in step S113 is YES and the determination result in step S114 is "bright", the GPS time correction processing 1 is performed; otherwise, the process is finished.

This, as in the above case, avoids a futile attempt of the GPS time correction processing 1, and reduces the power consumption.

While the electronic timepiece 1 according to the preferred embodiment has been described above on the basis of the specific embodiment, the present invention is not limited to the above-described specific embodiment. The technical scope of an embodiment includes various modifications and improvements within the range where the object of the present invention is achieved, as will be apparent to those skilled in the art from the scope of the claims.

What is claimed is:

1. An electronic timepiece, comprising:
  a clocking means configured to clock time;
  a switch configured to accept an input; and
  a processor configured to:
    measure a period during which the switch is accepting an input;
    determine, in accordance with a result of the measurement, whether to change time difference data set in the electronic timepiece;
    compare the result of the measurement with a plurality of threshold values;
    select, based on a result of the comparison, a time correction mode from among a plurality of time correction modes, the plurality of time correction modes including at least a first time correction mode and a second time correction mode; and
    correct the time clocked by the clocking means based on the selected time correction mode and the time difference data,
  wherein in the first time correction mode, the processor corrects the time clocked by the clocking means based on externally acquired time correction data, while keeping the time difference data set in the electronic timepiece unchanged, when it is determined that a current time corresponds to one of plural predetermined first set times, and
  wherein in the second time correction mode, the processor changes the time difference data set in the electronic timepiece, and corrects the time clocked by the clocking means based on the externally acquired time correction data, when it is determined that the current time corresponds to one of plural predetermined second set times.

2. The electronic timepiece according to claim 1, wherein the time difference data set in the electronic timepiece includes (i) time difference information using a standard time as a reference, and (ii) information on daylight saving time used during a certain period of time.

3. The electronic timepiece according to claim 2, wherein the time correction data is a GPS signal transmitted from a GPS satellite, and
  wherein the processor is configured to:
    in the first time correction mode, correct the time clocked by the clocking means based on time data included in the GPS signal received from the GPS satellite, while keeping the time difference data set in the electronic timepiece unchanged, and
    in the second time correction mode, change the time difference data set in the electronic timepiece based on positional data included in the GPS signal received from the GPS satellite, and correct the time clocked by the clocking means based on the time data included in the GPS signal received from the GPS satellite.

4. The electronic timepiece according to claim 3, wherein the time correction data is time data and time difference data retained by a mobile terminal, and
  wherein the processor is configured to:
    in the first time correction mode, correct the time clocked by the clocking means based on the time data and the time difference data acquired from the mobile terminal, while keeping the time difference data set in the electronic timepiece unchanged, and
    in the second time correction mode, change the time difference data set in the electronic timepiece based on the time difference data acquired from the mobile terminal, and correct the time clocked by the clocking means based on the time data acquired from the mobile terminal.

5. The electronic timepiece according to claim 4, wherein the processor first attempts to acquire the time data and the time difference data from the mobile terminal, and when the acquisition attempt fails, the processor then receives the GPS signal from the GPS satellite.

6. The electronic timepiece according to claim 2, wherein the time correction data is time data and time difference data retained by a mobile terminal, and
wherein the processor is configured to:
in the first time correction mode, correct the time clocked by the clocking means based on the time data and the time difference data acquired from the mobile terminal, while keeping the time difference data set in the electronic timepiece unchanged, and
in the second time correction mode, change the time difference data set in the electronic timepiece based on the time difference data acquired from the mobile terminal, and correct the time clocked by the clocking means based on the time data acquired from the mobile terminal.

7. The electronic timepiece according to claim 6, wherein the processor first attempts to acquire the time data and the time difference data from the mobile terminal, and when the acquisition attempt fails, the processor then receives the GPS signal from the GPS satellite.

8. The electronic timepiece according to claim 1, wherein the time correction data is a GPS signal transmitted from a GPS satellite, and
wherein the processor is configured to:
in the first time correction mode, correct the time clocked by the clocking means based on time data included in the GPS signal received from the GPS satellite, while keeping the time difference data set in the electronic timepiece unchanged, and
in the second time correction mode, change the time difference data set in the electronic timepiece based on positional data included in the GPS signal received from the GPS satellite, and correct the time clocked by the clocking means based on the time data included in the GPS signal received from the GPS satellite.

9. The electronic timepiece according to claim 8, wherein the time correction data is time data and time difference data retained by a mobile terminal, and
wherein the processor is configured to:
in the first time correction mode, correct the time clocked by the clocking means based on the time data and the time difference data acquired from the mobile terminal, while keeping the time difference data set in the electronic timepiece unchanged, and
in the second time correction mode, change the time difference data set in the electronic timepiece based on the time difference data acquired from the mobile terminal, and correct the time clocked by the clocking means based on the time data acquired from the mobile terminal.

10. The electronic timepiece according to claim 9, wherein the processor first attempts to acquire the time data and the time difference data from the mobile terminal, and when the acquisition attempt fails, the processor then receives the GPS signal from the GPS satellite.

11. The electronic timepiece according to claim 1, wherein the time correction data is time data and time difference data retained by a mobile terminal, and
wherein the processor is configured to:
in the first time correction mode, correct the time clocked by the clocking means based on the time data and the time difference data acquired from the mobile terminal, while keeping the time difference data set in the electronic timepiece unchanged, and
in the second time correction mode, change the time difference data set in the electronic timepiece based on the time difference data acquired from the mobile terminal, and correct the time clocked by the clocking means based on the time data acquired from the mobile terminal.

12. The electronic timepiece according to claim 11, wherein the processor first attempts to acquire the time data and the time difference data from the mobile terminal, and when the acquisition attempt fails, the processor then receives the GPS signal from the GPS satellite.

13. The electronic timepiece according to claim 1, wherein the processor is configured to:
switch an automatic time correction mode between an automatic mode and a fixed mode, based on the result of the measurement;
in a case where the automatic time correction mode is set to the automatic mode, determine whether or not the current time is a first set time, the first set time being a predetermined time for the automatic time correction mode; and
in a case where it is determined that the current time is the first set time, correct the time clocked by the clocking means and change the time difference data set in the electronic timepiece based on time data and time difference data which are acquired from an external apparatus.

14. The electronic timepiece according to claim 1, wherein the plural predetermined second set times include times also included among the plural predetermined first set times, excluding a time included among the plural predetermined first set times at which the electronic timepiece is likely to be indoors.

15. A time correction method in an electronic timepiece, the method comprising:
clocking time;
measuring a period during which an input-accepting switch is accepting an input;
determining, in accordance with a measurement result obtained in the measuring, whether to change time difference data set in the electronic timepiece;
comparing the measurement result with a plurality of threshold values;
selecting, based on a comparison result obtained in the comparing, a time correction mode from among a plurality of time correction modes, the plurality of time correction modes including at least a first time correction mode and a second time correction mode; and
correcting the time clocked in the clocking based on the selected time correction mode and the time difference data,
wherein in the first time correction mode, the correcting corrects the time clocked in the clocking based on externally acquired time correction data, while keeping the time difference data set in the electronic timepiece unchanged, when it is determined that a current time corresponds to one of plural predetermined first set times, and
wherein in the second time correction mode, the correcting changes the time difference data set in the electronic timepiece, and corrects the time clocked by the clocking means based on the externally acquired time correction data, when it is determined that the current time corresponds to one of plural predetermined second set times.

16. A non-transitory storage medium having recorded thereon a program readable by a computer, the computer including a clocking means configured to clock time, a switch configured to accept an input, and a measuring means configured to measure a period during which the switch is accepting an input, and the program causing the computer to:

determine, in accordance with a result of the measurement by the measuring means, whether to change time difference data set in the computer;

compare the result of the measurement with a plurality of threshold values;

select, based on a result of the comparison, a time correction mode from among a plurality of time correction modes, the plurality of time correction modes including at least a first time correction mode and a second time correction mode; and correct the time clocked by the clocking means based on the selected time correction mode and the time difference data, wherein in the first time correction mode, the computer corrects the time clocked by the clocking means based on externally acquired time correction data, while keeping the time difference data set in the electronic timepiece unchanged, when it is determined that a current time corresponds to one of plural predetermined first set times, and wherein in the second time correction mode, the computer changes the time difference data set in the electronic timepiece, and corrects the time clocked by the clocking means based on the externally acquired time correction data, when it is determined that the current time corresponds to one of plural predetermined second set times.

17. An electronic timepiece, comprising:
a clocking means configured to clock time;
a switch configured to accept an input; and
a processor configured to:

measure a period during which the switch is accepting an input;

determine, in accordance with a result of the measurement, whether to change time difference data set in the electronic timepiece;

compare the result of the measurement with a plurality of threshold values;

select, based on a result of the comparison, a time correction mode from among a plurality of time correction modes;

correct the time clocked by the clocking means based on the selected time correction mode and the time difference data;

switch an automatic time correction mode between an automatic mode and a fixed mode, based on the result of the measurement;

in a case where the automatic time correction mode is set to the automatic mode, determine whether or not a current time is a first set time, the first set time being a predetermined time for the automatic time correction mode;

in a case where it is determined that the current time is the first set time, correct the time clocked by the clocking means and change the time difference data set in the electronic timepiece based on time data and time difference data which are acquired from an external apparatus;

in a case where the correcting the time has failed, determine whether or not the current time is a second set time, the second set time being a predetermined time for the automatic time correction mode;

determine whether current surroundings of the electronic timepiece are bright or dark; and in a case where it is determined that the current surroundings of the electronic timepiece are bright, correct the time clocked by the clocking means and change the time difference data set in the electronic timepiece based on time data and time difference data which are acquired from a GPS satellite.

* * * * *